J. B. SKINNER.
Plow-Colter.
No. 66,259.
Patented July 2, 1867.
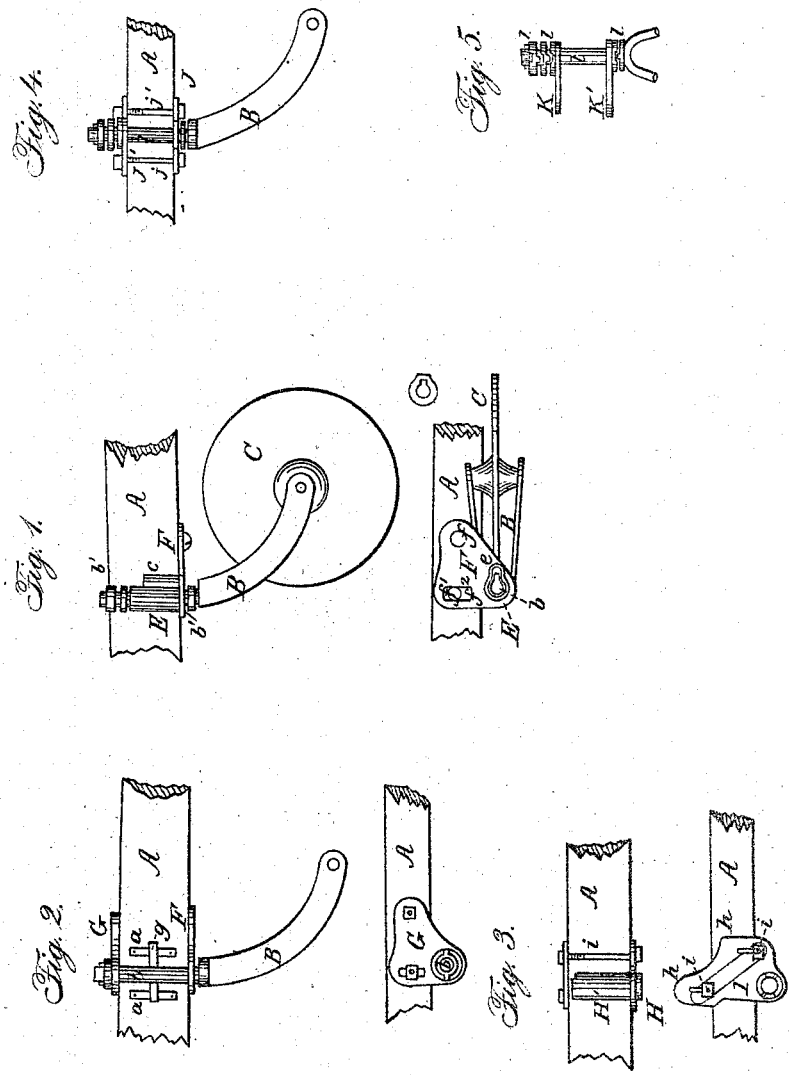

United States Patent Office.

JAMES B. SKINNER, OF ROCKFORD, ILLINOIS.

Letters Patent No. 66,259, dated July 2, 1867.

---

IMPROVEMENT IN PLOUGHS.

---

*The Schedule referred to in these Letters Patent and making part of the same.*

---

TO ALL WHOM IT MAY CONCERN:

Be it known that I, JAMES B. SKINNER, of Rockford, in the county of Winnebago, and State of Illinois, have invented certain new and useful Improvements in Ploughs, of which the following is a full, clear, and exact description, reference being had to the accompanying drawings which make part of this specification.

Coulters as heretofore constructed have been pivoted to a plough-beam in such manner as to leave the coulter free to swing round without restraint. This method of construction I have found by experiment to be defective, as in turning, the horses are liable to back into the coulter as it swings round, and injure themselves, or, in the case of gang-ploughs, the coulters when lifted in turning are apt to swing forward and cut into the axle or other parts of the machine.

Now it is the object of my invention to obviate the above-named and other objections to the use of swivelling coulters, and to this end the improvements herein claimed consist in so connecting a swivelling coulter to a plough-beam as to limit its lateral vibration, and yet allow the coulter to be adjusted both vertically and laterally on the beam.

In the accompanying drawings I have shown several modes of carrying out the object of my invention, each of the figures showing a different modification of my improvement. The plough-beam is shown in red in all the figures, and lettered A, and in each figure a coulter C is supposed to be pivoted to a swivelling bearing or caster-yoke, B, forming part of a spindle, $b$, as in Figure 1.

In Figure 1 the spindle $b$ is shown as inserted in a tubular socket, E, fixed to a bracket-plate, F, secured to the under side of the beam by a pivot, bolt, or screw, $f$, and adjusted and held nearer to or farther from the beam by a slot, $f^1$, and set-screw, $f^2$. The socket E has a groove or recess, $e$, formed on one side in which a pin or projection on the spindle $b$ plays. The recess is large enough to permit the play required by the coulter, and yet limits its vibration beyond a certain point. It is obvious that this plan might be varied by putting the pin on the socket, and the groove in the spindle, but this would be a change of form merely, while the principle would be the same. The coulter is adjusted vertically in its socket by means of washers $b'$ which in this instance are grooved to correspond with the socket E, in order to pass over the stem $b$ of the caster-yoke. These washers are placed above or below the beam to vary the adjustment as desired.

In Figure 2 an additional bracket, G, is shown as secured upon the top of the beam in the same way as the lower one F, fig. 1, while the spindle $b$ swivels in sockets in the bracket F G, the tubular socket being dispensed with. The vibration of the coulter is limited by a pin, $g$, which strikes against the beam which is protected by guard-plates $a$. This plan has the advantage of supporting the spindle both at top and bottom.

Figure 3 represents a slotted bracket-plate, H, carrying a tubular socket, H′, and secured on the under side of the beam by a clamp-bar, I, on top of the beam, and two connecting-bolts $i$, one on each side of the beam, which pass through slots $h$ in the bracket-plate. These slots permit the socket to be set in or out from the beam, and hold it securely in any desired position. The vibration of the coulter, in this instance, is limited by a recess in the top of the socket in which a pin on the spindle plays.

Figure 4 shows two slotted bracket-plates, J J′, connected by bolts $j j'$ passing through the beam, the caster-spindle passing through both brackets, which are adjusted by slots which permit their movement on the forward bolt $j$, the rear bolt $j'$ forming a pivot. The caster-spindle passes through these brackets and is limited in its vibration, as in fig. 3.

Figure 5 shows two slotted bracket-plates K K′ above and below the beam, connected by bolts $k$ on each side of the beam, and with the caster-spindle passing through the brackets. In this instance the washers $l$ are shown as interlocking with each other by means of tongues and grooves, the vibration of the spindle $b$ being limited by means of a pin on the spindle taking into either the top or the bottom of the washers.

By allowing the coulter to swivel it is enabled to follow the movements of the beam with less friction, while by limiting its vibration I prevent it from turning so far as to injure the team or interfere with the working of the plough, while the facilities afforded by my invention for both vertical and lateral adjustments of the coulter enable me readily to adapt it to the varying conditions under which it is required to work.

My improvements have been described as applied to a rolling coulter; it is, however, obvious that they are equally applicable to a curved cutting coulter.

What I claim as my invention, and desire to secure by Letters Patent, is—

1. Adjusting the coulter both vertically and laterally, substantially in the manner described.
2. The combination of the coulter-spindle with the bracket-plate and socket as shown in fig. 1.
3. The combination of the coulter-spindle with the double bracket-plates and stop pin, as shown in fig. 2.
4. The combination of the laterally adjustable bracket-plate, spindle-socket, and diagonal clamp, as shown in fig. 3.
5. The combination of the spindle laterally, adjustable bracket-plates, and clamp-bolts, as shown in fig. 4.
6. The combination with the caster-spindle of a series of locking washers, as shown in fig. 5, for the purpose described.

In testimony whereof I have hereunto subscribed my name.

JAMES B. SKINNER.

Witnesses:
    WHEELER MEAD,
    HENRY M. SKINNER.